United States Patent
Yamauchi

(10) Patent No.: US 11,306,712 B2
(45) Date of Patent: Apr. 19, 2022

(54) PUMP APPARATUS AND METHOD OF OPERATING PUMP

(71) Applicant: SUGINO MACHINE LIMITED, Uozu (JP)

(72) Inventor: Toyohiro Yamauchi, Uozu (JP)

(73) Assignee: SUGINO MACHINE LIMITED, Uozu (JP)

(*) Notice: Subject to any disclaimer, the term of this patent is extended or adjusted under 35 U.S.C. 154(b) by 126 days.

(21) Appl. No.: 16/707,268

(22) Filed: Dec. 9, 2019

(65) Prior Publication Data

US 2020/0325892 A1 Oct. 15, 2020

(30) Foreign Application Priority Data

Apr. 15, 2019 (JP) .............................. JP2019-076986

(51) Int. Cl.
*F04B 49/10* (2006.01)
*F04B 49/02* (2006.01)
(Continued)

(52) U.S. Cl.
CPC ........ *F04B 49/103* (2013.01); *A47L 15/0049* (2013.01); *A47L 15/4259* (2013.01); *F04B 17/00* (2013.01); *F04B 49/02* (2013.01); *B08B 2203/0223* (2013.01); *B08B 2203/0282* (2013.01); *F04B 2203/0209* (2013.01); *F04B 2207/703* (2013.01)

(58) Field of Classification Search
CPC .............................. F04B 49/103; F04B 49/02; F04B 2203/0209; F04B 2207/703; B08B 2203/0223; B08B 2203/0282; A47L 15/4259; A47L 15/0049
See application file for complete search history.

(56) References Cited

U.S. PATENT DOCUMENTS 3,486,072 A * 12/1969 Toulemonde ....... A47L 15/4259
307/120
9,055,851 B2 * 6/2015 Johansson ........... A47L 15/4259
(Continued)

FOREIGN PATENT DOCUMENTS

JP H05-123937 A 5/1993
JP H09-264261 A 10/1997
(Continued)

OTHER PUBLICATIONS

Machine Transalation of JP 2013090868.*
(Continued)

*Primary Examiner* — Christopher S Bobish
(74) *Attorney, Agent, or Firm* — United IP Counselors, LLC

(57) ABSTRACT

Provided is a pump apparatus capable of suppressing an unintentional ejection of a high-pressure liquid from a nozzle. A pump apparatus including: an injection chamber having a door; a nozzle arranged in the injection chamber; a pump connected to the nozzle for discharging liquid; a motor for driving the pump; a door sensor for detecting that the door is closed; and a control device capable of communicating with the door sensor, the control device having a motor rotation unit for supplying driving power to the motor only when the door sensor detects that the door is closed.

5 Claims, 5 Drawing Sheets

(51) Int. Cl.
    *A47L 15/42*    (2006.01)
    *A47L 15/00*    (2006.01)
    *F04B 17/00*    (2006.01)

(56) References Cited

U.S. PATENT DOCUMENTS

| 10,813,528 | B2* | 10/2020 | Chirumbolo | A47L 15/4263 |
| 2005/0126601 | A1* | 6/2005 | Jung | A47L 15/4257 |
| | | | | 134/25.2 |
| 2017/0181598 | A1* | 6/2017 | Zhou | A47L 15/4244 |

FOREIGN PATENT DOCUMENTS

| JP | 3065905 | B2 | | 7/2000 |
| JP | 2002-174181 | A | | 6/2002 |
| JP | 2005-118378 | A | | 5/2005 |
| JP | 2005-329068 | A | | 12/2005 |
| JP | 2007-225019 | A | | 9/2007 |
| JP | 2010-000280 | A | | 1/2010 |
| JP | 2011-236009 | A | * | 5/2013 |
| JP | 2013-090868 | A | | 5/2013 |
| JP | 2014-151280 | A | | 8/2014 |
| JP | 2016-142216 | A | | 8/2016 |

OTHER PUBLICATIONS

Office Action dated Feb. 2, 2021 in a corresponding Japanese patent application No. 2019-076986 (5 pages).
Office Action dated Oct. 6, 2020 in a corresponding Japanese patent application No. 2019-076986 (5 pages).
Extended European Search Report dated May 14, 2020 in a corresponding European patent application No. 19215227.0.

* cited by examiner

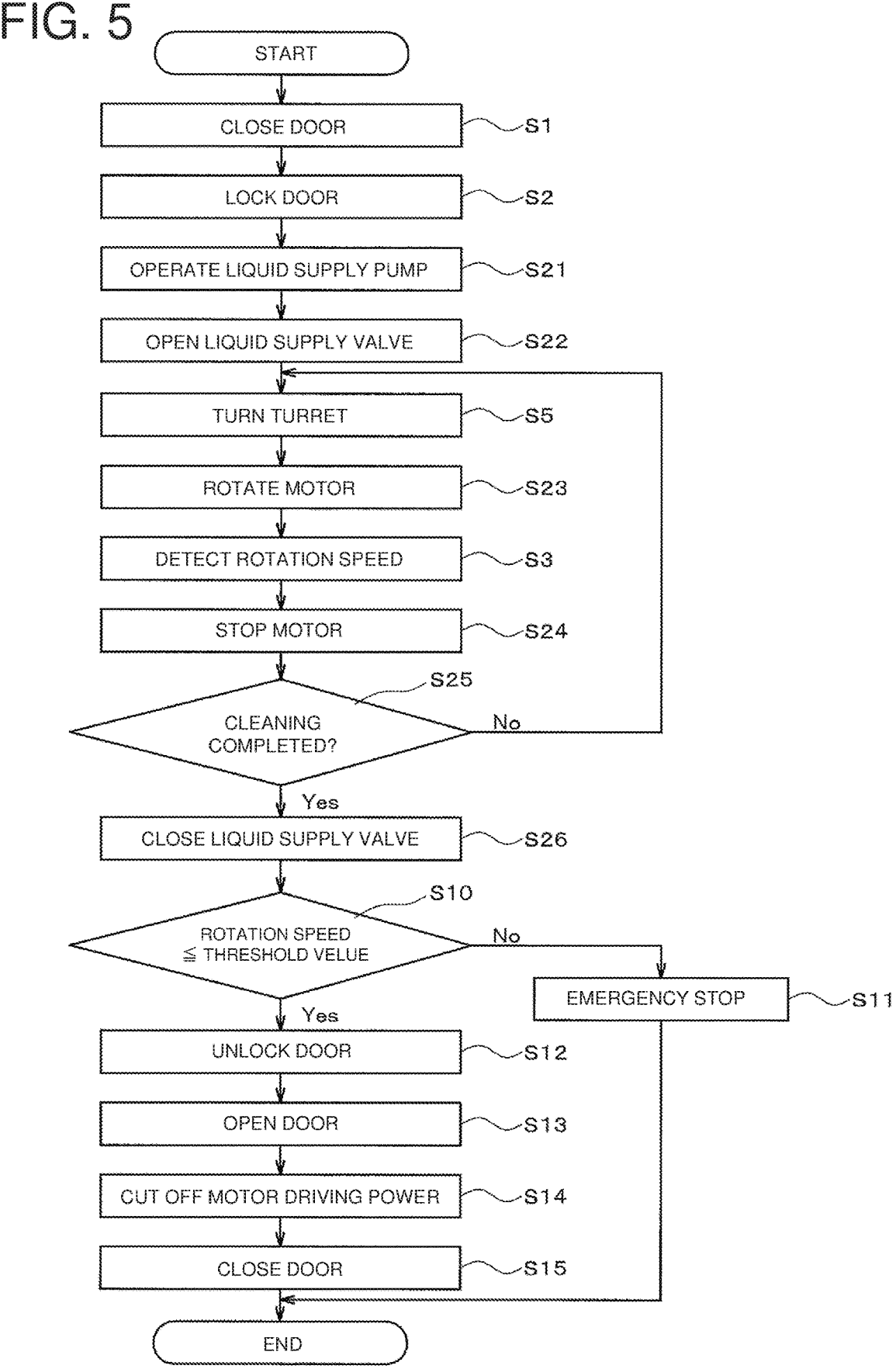

PUMP APPARATUS AND METHOD OF OPERATING PUMP

CROSS-REFERENCE TO RELATED APPLICATIONS

This application claims the benefit of priority to Japanese Patent Application No. 2019-076986, filed on Apr. 15, 2019, the entire contents of which are hereby incorporated by reference.

BACKGROUND

1. Technical Field

The present invention relates to a pump apparatus and a method of operating a pump.

2. Description of the Background

A machine tool having a frame, a turret base on which nozzles are arranged, a liquid pressurizing means, and a high-pressure shift valve having a tank valve and a supply valve 143 has been proposed (Japanese Patent No. 3065905, hereinafter referred to as "Patent Literature 1").

BRIEF SUMMARY

In the machine tool of Patent Literature 1, when the injection of the high-pressure liquid from the nozzle is started, the tank valve is closed and the supply valve is opened. When the injection of the high-pressure liquid from the nozzle is stopped, the tank valve is opened and the supply valve is closed. The liquid pressurizing means is operated regardless of whether the nozzle jets liquid or not. Therefore, there is a possibility that the high-pressure liquid is accidentally ejected from the nozzle due to the abnormal operation of the high-pressure shift valve.

A first aspect of the present invention is a pump apparatus, including:
 an injection chamber having a door;
 a nozzle arranged in the injection chamber;
 a pump connected to the nozzle, the pump configured to discharge liquid;
 a motor configured to drive the pump;
 a door sensor configured to detect that the door is closed; and
 a control device configured to communicate with the door sensor, the control device having a motor rotation unit configured to supply driving power to the motor only when the door sensor detects that the door is closed.

A second aspect of the present invention is a method of operating a pump, including:
 closing a door of an injection chamber that contains a nozzle;
 rotating a motor that drives a pump while the door is closed;
 stopping the motor while the door is closed;
 detecting a rotation speed of the pump;
 monitoring that the rotation speed is equal to or less than a threshold value while the pump is stopped, the threshold value being a rotation speed of the motor at which a discharge pressure of the pump is equal to or less than a safety pressure;
 opening the door when the rotation speed is equal to or less than the threshold value; and
 stopping in an emergency when the rotation speed exceeds the threshold value.

The present invention is applied to, for example, a cleaning machine or a machine tool. The cleaning machine includes a deburring machine that utilizes a high pressure liquid jet. The injection chamber is, for example, a cleaning chamber or a processing chamber. The nozzle may include a cutting tool of a machine tool.

One or more nozzles may be arranged in the injection chamber. The nozzles may be arranged in a selection device for switching the nozzles. The selection device is, for example, a turret, a nozzle changeover valve or an automatic tool changer.

The motor is preferably a permanent magnet synchronous motor (PMS 4). PMSM is particularly preferred when the pumps run for 10 seconds to 5 minutes, inclusive. The motor may be an inductive motor.

The pump is, for example, a piston pump, a geared pump, or a spiral pump. The discharge pressure of the pump is, for example, 5 to 200 MPa. Permanent magnet synchronous motors and induction motors may be combined with any pump.

The rotation speed meter is, for example, an encoder or a resolver. The rotation speed meter may be located on the pump. The rotation speed meter may be incorporated in the motor. For example, a servo motor with a built-in encoder can be used.

The motor rotation unit is, for example, an inverter or a servo amplifier.

For example, the power cutoff unit cuts off a contact arranged on a power line connecting the motor and the motor rotation unit.

The door is, for example, an automatic door or an inspection door. The door includes, for example, a carry-in/out door of an object.

Liquid is ejected from the nozzle at a flow speed and a flow rate corresponding to the discharge pressure of the pump. The safety pressure is set as a pressure at which the jet generated from the nozzle does not harm a human body. Preferably, the threshold value of the rotational speed is slightly greater than the rotational speed of the pump in inactive mode.

If the pump rotation unit rotates the motor only during injection, the pump may be connected directly to the nozzle or to the selection device. In other words, it is not necessary to provide a cleaning valve and a return valve between the pump and the nozzle or the selection device.

In the case where the pump rotation unit rotates the motor only at the time of injection, preferably, the pump apparatus further includes a liquid supply pump and a liquid supply valve. The liquid supply pump is rotated in advance before the pump is rotated. After stopping the pump, the liquid supply valve is closed.

According to the present invention, it is possible to suppress the high-pressure liquid from being unintentionally ejected from the nozzle.

BRIEF DESCRIPTION OF DRAWINGS

FIG. 5 is a flow chart showing the method of operating the pump of the second embodiment.

DETAILED DESCRIPTION

First Embodiment

Figure 1:
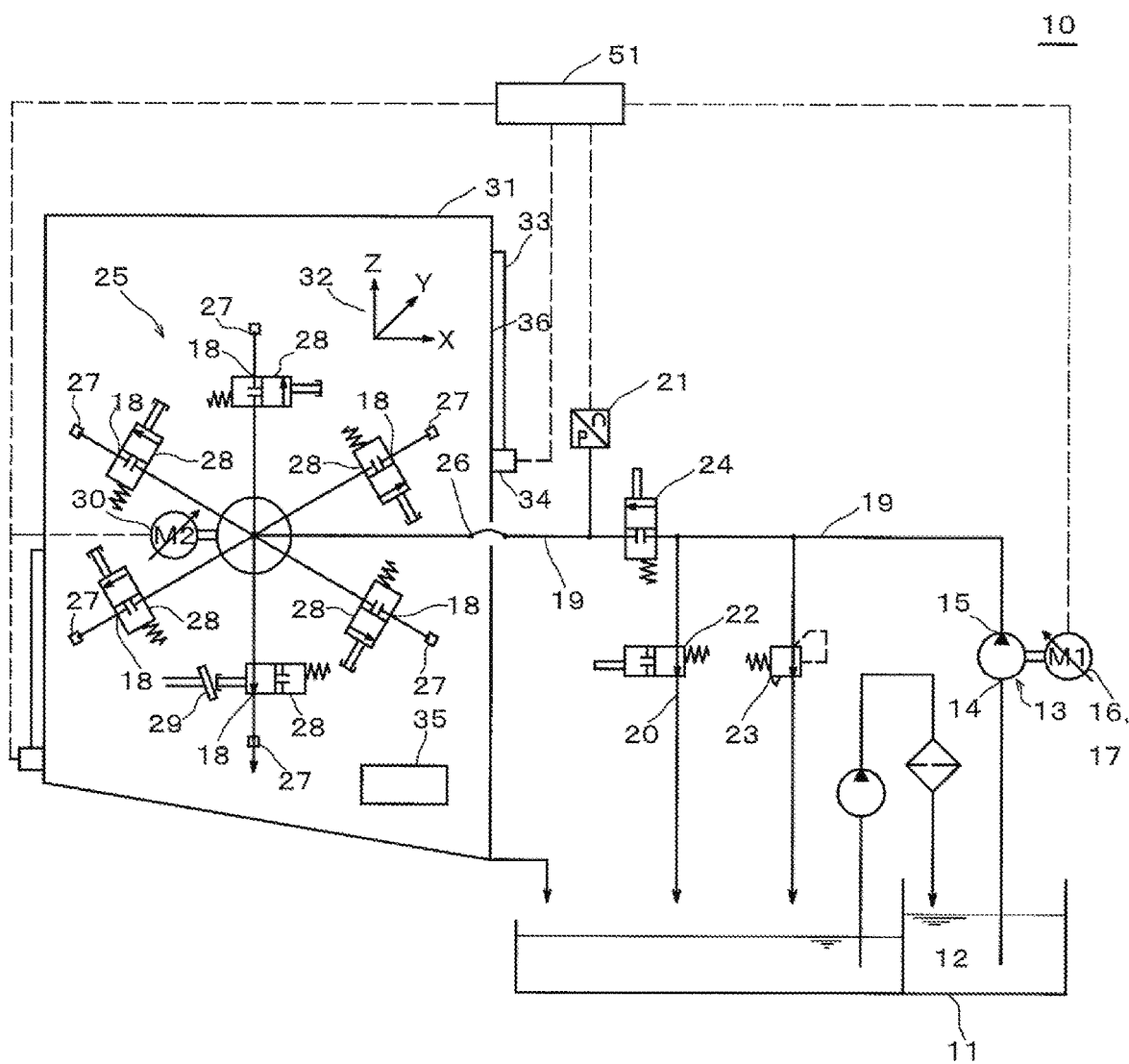
FIG. 1 shows a pump apparatus according to the first embodiment.

As shown in FIG. 1, the pump apparatus 10 of the first embodiment includes a tank 11, a cleaning chamber (injection chamber) 31, a door 33, a door sensor 34, a cleaning valve 24, a return valve 22, a cleaning pipe 19, a pump (main pump) 13, a motor 16, a nozzle 27, and a control device 51. The pump apparatus 10 may include a rotation speed meter 17, a moving device 32, a turret (selecting device) 25, a pressure sensor 21 and a safety valve 23.

The cleaning chamber 31 has a plurality of openings 36. A door 33 is disposed in each opening 36. A door sensor 34 is disposed on each door 33. The door sensor 34 may be an electronic lock. The door sensor 34 detects that the door 33 is closed and communicates it to the control device 51.

The object 35 is carried into and out of the cleaning chamber 31 through the opening 36. The object 35 has one or more portions to be cleaned. The portion to be cleaned is, for example, an internal thread, an oil hole, a water hole, a mounting surface, or a pin hole. The object 35 is, for example, a fuel injection nozzle, an ABS body, a cylinder head, a cylinder block, a crankshaft, a case transaxle, and a valve body for an automobile.

The nozzle 27 is disposed inside the cleaning chamber 31. The nozzle 27 may be arranged on the turret 25, which is a selecting device. One or more nozzles 27 are arranged inside the cleaning chamber 31. If the pump apparatus 10 includes a turret 25, a plurality of types of nozzles 27 are arranged inside the cleaning chamber 31. The nozzle 27 is, for example, a straight nozzle, an angle nozzle, or a lance.

The turret 25 is arranged on the moving device 32. The turret 25 has an inlet 26, a plurality of outlets 18, a plurality of selecting valves 28 and a roller follower 29, and may include a turn motor 30. The nozzle 27 is connected to a selecting valve 28. The selecting valve 28 is connected to the inlet 26. For example, as the turret 25 rotates, only the selecting valve corresponding to the nozzle 27 located on the turret surface indexed by the roller follower 29 is opened. The other selecting valves 28 are closed. Only the nozzle 27 selected by the turret 25 is connected to the inlet 26, and the other nozzles 27 are not connected to the inlet 26. The turret 25 opens one nozzle 27 indexed to a specific phase by the roller follower 29 so that the cleaning liquid 12 is jetted. The inlet 26 is connected to a discharge port 15 by the cleaning pipe 19. The turn motor 30 turns the turret 25. The turret 25 is shown, for example, in Japanese Patent Nos. 6147623 and 5704997.

The moving device 32 is, for example, a column traverse mechanism. The moving device 32 is numerically controlled to move the nozzle 27 and the turret 25.

The tank 11 is, for example, a two-tank type tank. The tank 11 stores a cleaning liquid 12. The cleaning liquid 12 is, for example, an aqueous cleaning liquid such as a basic or neutral cleaning liquid.

The pump 13 has a liquid supply port 14 and the discharge port 15. The liquid supply port 14 is connected to the tank 11. The discharge port 15 is connected to the nozzle 27 via the cleaning pipe 19, the cleaning valve 24 and the turret 25. The motor 16 is connected to the pump 13 and rotates the pump 13. The motor 16 is operated by the control device 51.

The discharge pressure P is generated by the rotation of the pump 13. The motor 16 may include a rotation speed meter 17.

The cleaning pipe 19 has a branch 20. The branch 20 is arranged between the cleaning valve 24 and the discharge port 15. The branch 20 is connected to the return valve 22 and to the tank 11. The cleaning valve 24 and the return valve 22 are two-way valves. The cleaning valve 24 is a normally closed solenoid valve. The return valve 22 is a normally open solenoid valve.

The pressure sensor 21 is arranged between the cleaning valve 24 and the nozzle 27. The pressure sensor 21 detects the pressure in the cleaning pipe 19, and sends the detected pressure to the control device 51.

Figure 2:
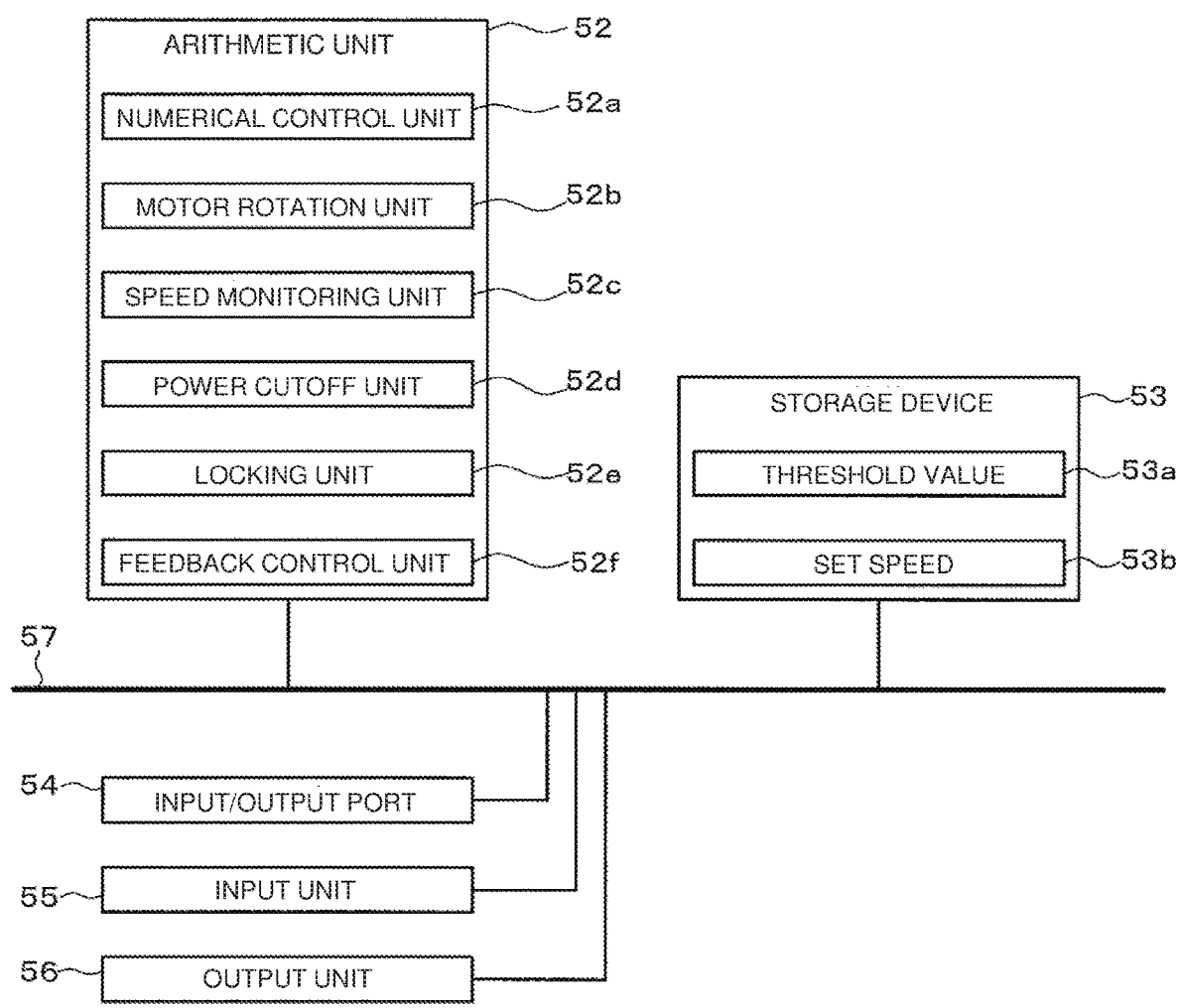
FIG. 2 shows a control device of the first embodiment.

As shown in FIG. 2, the control device 51 includes an arithmetic unit 52, a storage device 53, an input/output port 54, an input unit 55, an output unit 56, and a bus 57. The bus 57 communicably connects the arithmetic unit 52, the storage device 53, the input/output port 54, the input unit 55, and the output unit 56.

The storage device 53 may include a main storage device or an external storage device. The storage device 53 stores a threshold value 53a. The storage device 53 may store a set speed 53b. The set speed 53b is a set speed of the pump or the motor. The set speed 53b may be determined for each nozzle. The set speed 53b is, for example, a rotation speed, an acceleration, and a PID parameter.

The input/output port 54 is connected to the door sensor 34, the pressure sensor 21, the cleaning valve 24, the return valve 22, the motor 16, the moving device 32, and the turret 25.

The input unit 55 is, for example, a keyboard or a pointing device. The input unit 55 may be a software keyboard or a touch panel. The output unit 56 is, for example, a monitor.

The arithmetic unit 52 includes a numerical control unit 52a, a motor rotation unit 52b, and a speed monitoring unit 52c. The arithmetic unit 52 may include a power cutoff unit (motor power cutoff unit) 52d, a locking unit 52e, and a feedback control unit 52f.

The numerical control unit 52a numerically controls the moving device 32. The numerical control unit 52a controls the pump 13, the cleaning valve 24, the return valve 22, the door sensor 34, and the turn motor 30 in accordance with the cleaning program.

The motor rotation unit 52b includes an inverter and a servo amplifier. The motor rotation unit 52b rotates or stops the motor 16. The motor rotation unit 52b determines the rotation speed of the motor 16. The motor rotation unit 52b may supply driving power to the motor 16 only when the door sensor 34 detects that the door 33 is closed. The motor rotation unit 52b rotates the motor 16 in accordance with the set speed 53b. The motor rotation unit 52b may include a speed monitoring unit 52c, a power cutoff unit 52d, and a feedback control unit 52f.

The speed monitoring unit 52c monitors whether or not the rotational speed of the pump 13 is equal to or less than the threshold value. When the closing of the door 33 is not detected and the pump 13 rotates beyond the threshold value, the speed monitoring unit 52c stops the pump apparatus 10 in an emergency. Instead of the speed of the pump 13, the speed monitoring unit 52c may monitor whether or not the pump 13 is rotating.

The power cutoff unit 52d cause the motor rotation unit 52h to cut off the supply of the driving power to the motor 16. For example, the power cutoff unit 52d cuts off a contact (not shown) arranged on a power line connecting the motor 16 and the motor rotation unit 52b. The contact is, for example, an electromagnetic contactor or an electromagnetic switch. The power cutoff unit 52d cuts off the driving power to the motor 16 when the nozzle 27 does not eject a jet.

The feedback control unit 52f feeds back the pressure P detected by the pressure sensor 21, and controls the rotation speed of the motor 16 so that the difference between the pressure P and the set pressure approaches zero. For example, the feedback control unit 52f controls the motor 16 by PID control. At this time, the feedback control unit 52f may compare the moving average of the pressure P with the set pressure.

The locking unit 52e locks or unlocks the door 33 by the door sensor 34. The locking unit 52e locks the door 33 by electronic locking while driving power is supplied to the motor 16.

Figure 3:
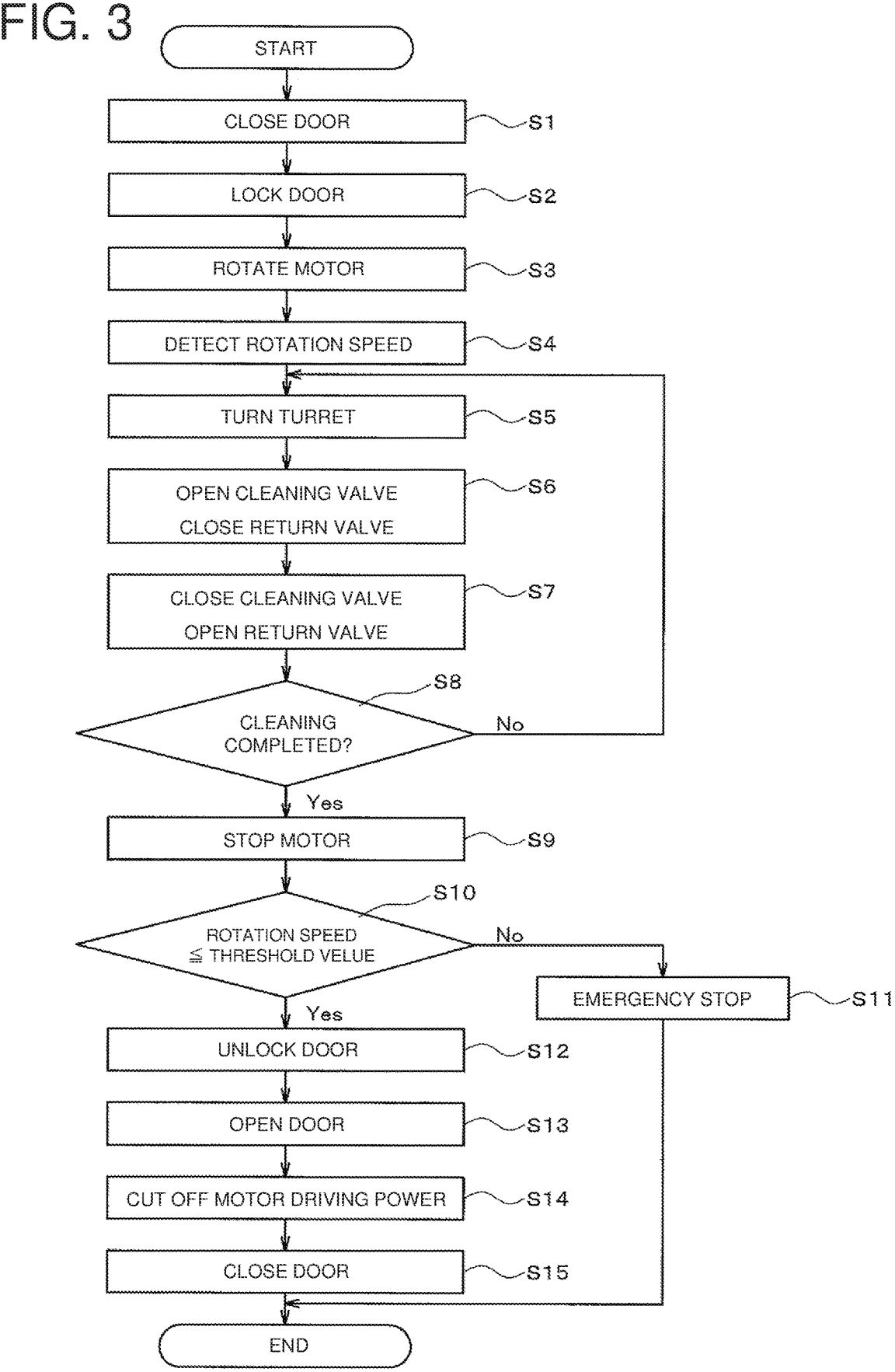
FIG. 3 is a flow chart showing the method of operating the pump of the first embodiment.

The method of controlling the pump will be described in order with reference to FIG. 3.

The object 35 is conveyed into the cleaning chamber 31 by a conveying device (not shown) or an operator. In step S1, the door 33 is closed by the control device 51 or the operator.

In step S2, the door sensor 34 locks the door 33 by the locking unit 52e.

In step S3, the motor rotation unit 52b rotates the motor 16.

In step S4, the rotation speed meter 17 detects the rotation speed of the motor 16 or the pump 13.

In step S5, the numerical control unit 52a rotates the turn motor 30 to turn the turret 25. One nozzle 27 is determined, and the selecting valve 28 corresponding to the determined nozzle 27 is opened.

In step S6, the numerical control unit 52a opens the cleaning valve 24 and closes the return valve 22. The cleaning liquid 12 flows through the cleaning valve 24, the cleaning pipe 19, and the turret 25 to the nozzle 27, and a jet is ejected from the nozzle 27. The numerical control unit 52a moves the nozzle 27 relative to the object 35 by the moving device 32, and the jet of the cleaning liquid 12 collides with the object 35.

In step S7, the numerical control unit 52a closes the cleaning valve 24 and opens the return valve 22. The cleaning liquid 12 returns to the tank 11 via a branch 20. The jet of the cleaning liquid 12 from the nozzle 27 is stopped. Then, the pressure from the cleaning valve 24 to the nozzle 27 drops to near the atmospheric pressure.

In step S8, the numerical control unit 52a repeats steps S5 to S7 until the cleaning is completed.

In Step S9, after the cleaning is completed, the motor rotation unit 52b causes the motor 16 to stop in a state in which the motor 16 can be rotated. As a result, the motor 16 is in inactive mode.

In step S10, the speed monitoring unit 52c monitors whether the rotation speed is equal to or lower than the threshold value.

In step S11, the speed monitoring unit 52c stops the pump apparatus 10 in an emergency if the rotation speed exceeds the threshold value.

In step S12, after the speed monitoring unit 52c confirms that the rotation speed is equal to or lower than the threshold value, the locking unit 52e unlocks the door 33.

In step S13, the door 33 is opened by the control device 51 or the operator. The object 35 is carried out of the cleaning chamber 31 by a robot or the operator.

In step S14, the power cutoff unit 52d cuts off the driving power supplied from the motor rotation unit 52b to the motor 16. The cutting off the drive power takes place, for example, at the control level of the electromagnetic contactor.

In step S15, the door 33 is closed by the control device 51 or the operator.

The step S10 is continuously executed while the steps S11 to S15 are executed. That is, while the door sensor 34 does not detect that the door 33 is closed, the speed monitoring unit 52c constantly monitors that the rotation speed is equal to or lower than the threshold value.

Further, while the door sensor 34 does not detect that the door 33 is closed, the power cutoff unit 52d cuts off the driving power of the motor 16.

If the pump apparatus 10 does not have a turret 25, step S5 is omitted. If the pump apparatus 10 does not have the power cutoff unit 52d, step S14 is omitted. If the pump apparatus 10 does not have the locking unit 52e, steps S2 and S12 are omitted.

While the door 33 is opened, the speed monitoring unit 52c monitors whether the rotation speed is equal to or lower than the threshold value. Therefore, even when the cleaning valve 24 cannot completely seal the cleaning liquid 12, the ejection of the high-pressure jet from the nozzle 27 is suppressed.

Further, when the power cutoff unit 52d is provided, the driving power is not supplied to the motor 16 while the door 33 is opened. Therefore, the safety monitoring level is improved.

Second Embodiment

Figure 4:
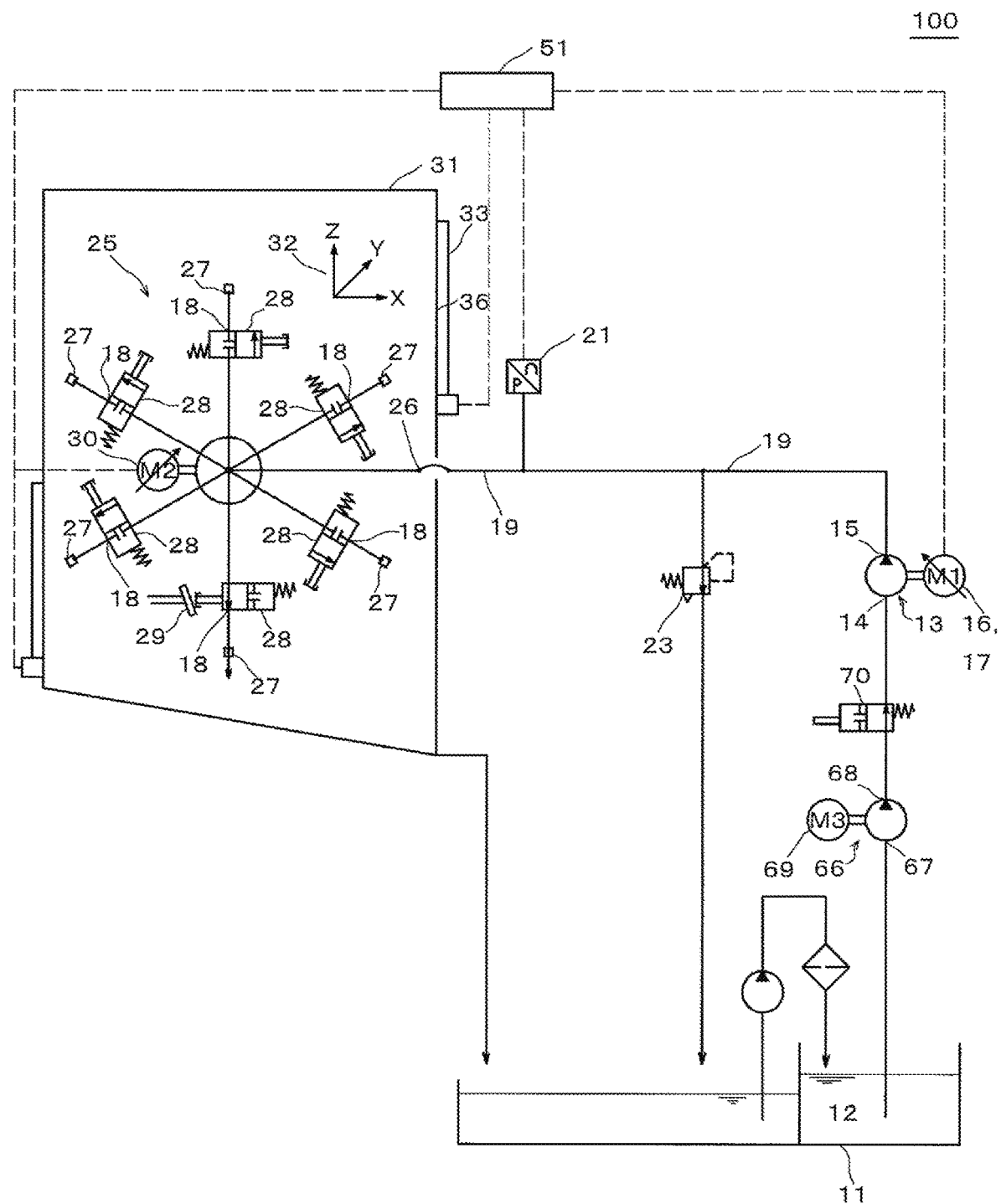
FIG. 4 shows a pump apparatus according to the second embodiment.

As shown in FIG. 4, the pump apparatus 100 of the second embodiment includes a liquid supply pump 66 and a liquid supply valve 70, and does not include the cleaning valve 24, the return valve 22, and the branch 20. The rest is substantially the same as the pump apparatus 10 of the first embodiment.

The liquid supply pump 66 is, for example, a spiral pump. The liquid supply pump 66 has a suction port 67, a discharge port 68, and a motor 69. The suction port 67 is connected to the tank 11.

The liquid supply valve 70 is a normally closed two-way electromagnetic valve. The liquid supply valve 70 is disposed between the discharge port 68 and the liquid supply port 14.

The discharge port 15 is directly connected to the nozzle or the selecting device by the cleaning pipe 19.

The cleaning method of the present embodiment will be described with reference to FIG.

After the execution of step S2, the control device 51 operates the liquid supply pump 66 in step S21.

In step S22, the control device 51 opens the liquid supply valve 70. The cleaning liquid 12 is supplied to the pump 13.

Step S5 is executed.

In step S23, the numerical control unit 52a causes the motor rotation unit 52b to rotate the motor 16. The pump 13 rotates, and the cleaning liquid 12 passes through the liquid supply pump 66, the pump 13, the cleaning valve 24, the cleaning pipe 19, and the turret 25, and is ejected from the liquid supply valve 70 and the nozzle 27.

Step S3 is executed.

In step S24, the numerical control unit 52a causes the motor rotation unit 52b to stop controlling the motor 16 in a state in which the motor 16 can be rotated. The pump 13 is stopped. The discharge pressure of the nozzle 27 drops to the discharge pressure of the liquid supply pump 66.

Steps S5, S23, S3, and S24 are repeated until the cleaning is completed.

After completion of the cleaning, the liquid supply valve 70 is closed in step S26. The nozzle 27 stops jetting.

In the pump apparatus 100 of the present embodiment, since the pump 13 is directly connected to the nozzle 27, the pump 13 is operated only during the time when the nozzle 27 injects the cleaning liquid 12. According to the present embodiment, since there is no excessive operation time of the pump 13, the power consumption is reduced. Further, the operation time of the cleaning valve 24 and the return valve 22 becomes unnecessary. Therefore, the rise time of the pressure at the time of starting the injection is shortened.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, amendments, variations, or improvements may be made in light of the teachings disclosed herein and are within the extent of the appended claims.

REFERENCE SIGNS LIST 10, 100 Pumping apparatus
12 Cleaning liquid
13 Pump
16 Motor
17 Rotation speed meter
27 Nozzle
31 Cleaning chamber (injection chamber)
33 Door
34 Door sensor
35 Object
51 Control device

What is claimed is:

1. A method of operating a pump of a pump apparatus, comprising:
   closing a door of an injection chamber that contains a nozzle;
   rotating a motor that drives a pump while the door is closed, the pump connected to the nozzle to eject liquid at a pressure exceeding a safety pressure while cleaning;
   detecting a rotation speed of the pump;
   inactivating the motor in a state in which the pump is still rotatable while the door is closed to stop the cleaning;
   opening the door when the rotation speed of the pump is equal to or less than a threshold value, the threshold value being a rotation speed of the motor at which a discharge pressure of the pump is equal to or less than the safety pressure;
   continuing to monitor that the rotation speed of the pump is equal to or less than the threshold value while the door is open; and
   stopping the pump apparatus in an emergency when the rotation speed of the pump exceeds the threshold value while the door is open.

2. The method of operating the pump according to claim 1, further comprising:
   cutting off driving power to the motor while the door is open.

3. The method of operating the pump according to claim 2, wherein
   the safety pressure is a pressure at which the liquid does not harm a human body.

4. The method of operating the pump according to claim 1, wherein
   the pump discharges the liquid having a pressure of 5 to 200 MPa while cleaning with the door closed.

5. The method of operating the pump according to claim 1, wherein
   the safety pressure is a pressure at which the liquid does not harm a human body.

* * * * *